United States Patent
Fairchild et al.

(10) Patent No.: US 10,410,245 B2
(45) Date of Patent: Sep. 10, 2019

(54) SYSTEM AND METHODS FOR USING A REVENUE VALUE INDEX TO SCORE IMPRESSIONS FOR USERS FOR ADVERTISEMENT PLACEMENT

(71) Applicant: OpenX Technologies, Inc., Pasadena, CA (US)

(72) Inventors: Jason Fairchild, Rolling Hills Estates, CA (US); Qasim Saifee, Northridge, CA (US); Anke Audenaert, Los Angeles, CA (US)

(73) Assignee: OPENX TECHNOLOGIES, INC., Pasadena, CA (US)

( * ) Notice: Subject to any disclaimer, the term of this patent is extended or adjusted under 35 U.S.C. 154(b) by 362 days.

(21) Appl. No.: 13/895,316

(22) Filed: May 15, 2013

(65) Prior Publication Data

US 2014/0344049 A1    Nov. 20, 2014

(51) Int. Cl.
*G06Q 30/02* (2012.01)

(52) U.S. Cl.
CPC .................. *G06Q 30/0246* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0182676 A1* | 8/2005 | Chan | ...................... | G06Q 30/02 705/14.42 |
| 2007/0005418 A1 | 1/2007 | Nishar et al. | | |
| 2007/0027771 A1* | 2/2007 | Collins | .............. | G06Q 10/0631 705/14.48 |
| 2008/0097834 A1* | 4/2008 | McElfresh | ............. | G06Q 30/02 705/7.29 |
| 2009/0132368 A1* | 5/2009 | Cotter | .................... | G06Q 30/02 705/14.55 |
| 2010/0198695 A1* | 8/2010 | Muthukrishnan | ...... | G06Q 30/02 705/14.71 |
| 2011/0258049 A1* | 10/2011 | Ramer | ................... | G06Q 30/02 705/14.66 |
| 2013/0204715 A1* | 8/2013 | Zhang | ............... | G06Q 30/0241 705/14.73 |

(Continued)

OTHER PUBLICATIONS

International Search Report and Written Opinion, PCT/US2014/037026, dated Sep. 24, 2014 (13 pages).

*Primary Examiner* — Marie P Brady
(74) *Attorney, Agent, or Firm* — Patent Law Works LLP

(57) ABSTRACT

A system and methods are disclosed for creating and using a revenue value index to score impressions and users for purposes of determining fair pricing for advertisement ("ad") placement or to provide analytics and information to publishers for future use. The revenue value index may be configured to evaluate data obtained or acquired from first-party, publisher platforms and/or third-party platforms or other data sources for the purpose of valuing either ad impressions or the users engaging the websites on which ads are likely to be placed. The revenue value index may be utilized for either providing value information to entities (for example, publishers) or for measuring the value of ad impressions or users for use in determining fair pricing in real-time auctions conducted for ad placement.

17 Claims, 8 Drawing Sheets

(56) References Cited

U.S. PATENT DOCUMENTS

| | | | | |
|---|---|---|---|---|
| 2014/0278981 A1* | 9/2014 | Mersov | ............... | G06Q 30/02 705/14.53 |
| 2015/0339704 A1* | 11/2015 | Liu | ................ | G06Q 30/0247 705/14.46 |

* cited by examiner

USER SCORE + IMPRESSION SCORE = IMPRESSION VALUE
⎵
OPTIONAL
  IMPRESSION SCORE = TOTAL SCORE OF INDIVIDUAL IMPRESSION ATTRIBUTES

Figure 6

Example:

Attributes for User Impression 1

| Attributes | Scores |
|---|---|
| Above the Fold | 8 |
| US Impression | 8 |
| New York Geo | 9 |
| Medium Quality Pub | 7 |
| User Session Frequency 18 | 4 |
| Auto Intender | 9 |
| In Market Cruise Buyer | 9 |
| In Market Electronics (e.g. laptop) Buyer | 4 |
| Total Score | 58 |

Figure 7

SYSTEM AND METHODS FOR USING A REVENUE VALUE INDEX TO SCORE IMPRESSIONS FOR USERS FOR ADVERTISEMENT PLACEMENT

BACKGROUND

1. Field of the Invention

The present invention relates to advertisement ("ad") placement on websites accessed over the internet or otherwise via mobile applications accessed by—electronic computing devices including mobile devices. More particularly, the present invention relates to a system and methods for creating and using a revenue value index to score impressions and/or users for ad placement or to provide analytics and information to publishers for future use. The revenue value index is configured to evaluate data obtained or acquired from first-party and/or third-party and/or publisher platforms for the purpose of valuing either ad impressions or the users engaging the websites on which the ad is likely to be placed.

2. Description of the Related Art

With the popularity and use of the Internet and mobile computing devices, web browsers, mobile applications and sites providing content have grown dramatically over the past decade. With this growth there has been an equally dramatic growth and migration to online (for example, via the internet) and digital (for example, via mobile devices or applications) advertising. However, online and digital advertising presents a complex eco-system involving a complicated interplay among several entities, including online or digital publishers, online and digital advertisers (both informed and uninformed), and users or viewers who browse the internet to view all types of content available on websites that are of interest to them.

Digital advertising typically uses modeling platforms that use impressions (display of an ad to a user while viewing a web page), impression values (intrinsic, i.e., value to an "advertiser" and value to a "publisher" of content), estimated impression values, and inventory of content. Impression values include intrinsic values, which are values to advertisers and publishers. Estimated impression values include values to publishers and advertisers (both informed and uninformed).

Until now, many schemes that benefit advertisers exist. However, there are a myriad of challenges faced by publishers in this complex eco-system. First, it is difficult for internet publishers to accurately value their inventory of online or digital advertising impressions. Second, a subset of digital advertisers, who often devote considerable resources to understanding the value of user impressions, have a competitive advantage over other advertisers, which allows them to more accurately value page impressions. Generally, advertisers often invest a considerable amount of resources and time in determining the pricing of impressions that they are targeting. Advertisers often use third party data resources in the valuation process. By obtaining this additional information, advertisers can value an impression more accurately than their competitors and/or the publisher. This can result in differential bidding, where some advertisers are willing to pay much more than others. This often results in publishers being uninformed and receiving much less for their inventory from advertisers who pay less. Third, real-time bidding ("RTB") auctions allow advertisers to compete in real-time for publisher impressions. Often in these types of auctions, the final "clearing price" for an impression is based on the price bid by the second highest bidder and a "static" floor price that is set by the publisher associated with the impression. Yet, the publisher associated with the impression sets the static floor price, with little or no knowledge of its value, as a result of which that static floor price is frequently lower than what many advertisers are willing to pay, and therefore, publishers are not maximizing the value of their advertising inventory. Fourth, an informed advertiser may bid on an impression in at least two situations. For example, in a first situation, where the only competing bids are from uninformed advertisers. And, in a second situation, where the publisher has not accurately assessed the value of the impression. In either situation, it is possible and often likely, that the informed bidders will pay significantly less than they would have been prepared to pay because the second bid received and the publisher floor price are both too low.

For at least the reasons indicated above, to avoid pricing for publishers that is below what an informed publisher would demand, there is a clear need for publishers to be able to automatically and accurately value their impression inventory in order to protect themselves from informed advertisers in the RTB market place. Existing solutions do not adequately address this dire need for publishers to be able to automatically and accurately value their impression inventory to protect themselves from informed advertisers in the RTB market place.

There exist some schemes for determining overall content values for content elements and/or web pages in a web network, for example, conventional schemes configured to determine the value of content on a website and for optimizing viewer traffic through a website to maximize the value of the website. Such schemes have involved operations that separately analyze the revenue generated for each ad unit on every page of the website, the revenue from each component added up to determine the revenue value of the web page. Once the revenue value for each page is determined, the overall revenue of the website or network of sites is determined by adding together the revenue value for each page on a website or network of sites. The network of sites include a plurality of commonly managed or commonly owned sites; an advertising network of sites, where ads may be sold by one entity or by a plurality of related or unrelated entities; and/or a collection of other websites provided by related or unrelated entities that have decided to pool resources in order to optimize their revenue.

There are other schemes that enhance optimization of the revenue generated by a website or network of sites. Traffic over the internet is generally managed on the basis of the immediate revenue that can be generated, without taking into account the total revenue potential for each visit/view. Recent techniques for optimizing internet traffic flow focus on the entire website or network of sites and take into account value generated from a journey through various sites.

There is a need in the industry for establishing a revenue value index that may be used by publishers as well as others to measure the overall value (dollar or other) of ad impressions or users engaging websites on which ads will be placed in order to determine fair pricing.

SUMMARY

The present technology overcomes the deficiencies and limitations of prior systems and methods, at least in part by, providing systems and methods for creating and using a revenue value index to score impressions and/or users for purposes of determining fair or informed pricing for ad placement. The revenue value index may be configured to evaluate data obtained or acquired from first-party and/or third-party and/or publisher data management platforms for the purpose of valuing either ad impressions and/or the users engaging the websites on which ads are likely to be placed. The revenue value index may be utilized for either providing value information to entities (for example, publishers) or for measuring the value of ad impressions and/or users for use in determining fair or informed pricing in real-time auctions conducted for ad placement.

In some implementations, the system and methods of present technology apply data obtained from first-party and/or third-party and/or publisher data management platforms for the purpose of valuing ad impressions or users. In some implementations, the revenue value index may be created and used to score the ad impressions or users. One or more attributes relating to an ad impression may be considered individually and scored separately and then a total score for an ad impression is computed.

In some implementations, the system and methods may be configured to receive ad requests, gather information about the ad impression, for example, user agent settings, geo data, page location, etc. In some implementations, the system and methods may be configured to acquire, obtain, or gather first-party cookie data relating to a user and then gather third-party data relating to the user. The system and methods may be configured to assign a score to each attribute based on the value determined for each attribute. In some implementations, the system and methods may be configured to assign a value to the combination of user impressions based on a formula that either values a) the number of data elements available for each user; or b) the collective and relative value of each data segment available for each user.

The system and methods of this technology devise a scoring mechanism, which may be advantageously used for multiple purposes. As one example, the system and methods may be configured to create the revenue value index and use it to inform dynamic floor prices for a particular ad impression. In some implementations, dynamic floor prices may be time varying, discrete market pricing for multiple individual advertisers. As another example, the revenue value index may be used to send total scores that are determined for impressions to market buyers in order to help them value different ad impressions. As yet another example, the system and methods may be configured to permit publishers to access total scores (or individual components of the scores) for user segmentation. As yet another example, the system and methods may use the revenue value index to match impression inventory to the most likely buyer within a given market or via direct relationships that exist with either agencies or market buyers.

In some implementations, a method for measuring a revenue value for an impression for use in ad placement comprises operations for receiving an ad request from a user; identifying an impression for the ad request; receiving information about the impression from one or more data management platforms; determining various attributes relating to the impression; assigning a score to the various attributes in accordance with a scoring index created for evaluating impressions; and computing a total score for the impression configured to establish a revenue value for the impression.

The system and methods disclosed below may be advantageous in a number of respects. They provide revenue value index and a scoring mechanism to permit publishers and others to fairly measure the value of ad impressions or users to determine fair pricing for ad placement.

BRIEF DESCRIPTION OF THE DRAWINGS

The present invention is illustrated by way of example, and not by way of limitation in the figures of the accompanying drawings in which like reference numerals are used to refer to the same or similar elements.

FIG. 6 indicates an example algorithm of the revenue value index and scoring system for valuing ad impressions or users.

FIG. 7 is a chart illustrating an example scenario considering different attributes considered for computing a total score for an example ad impression.

DETAILED DESCRIPTION

Figure 1:
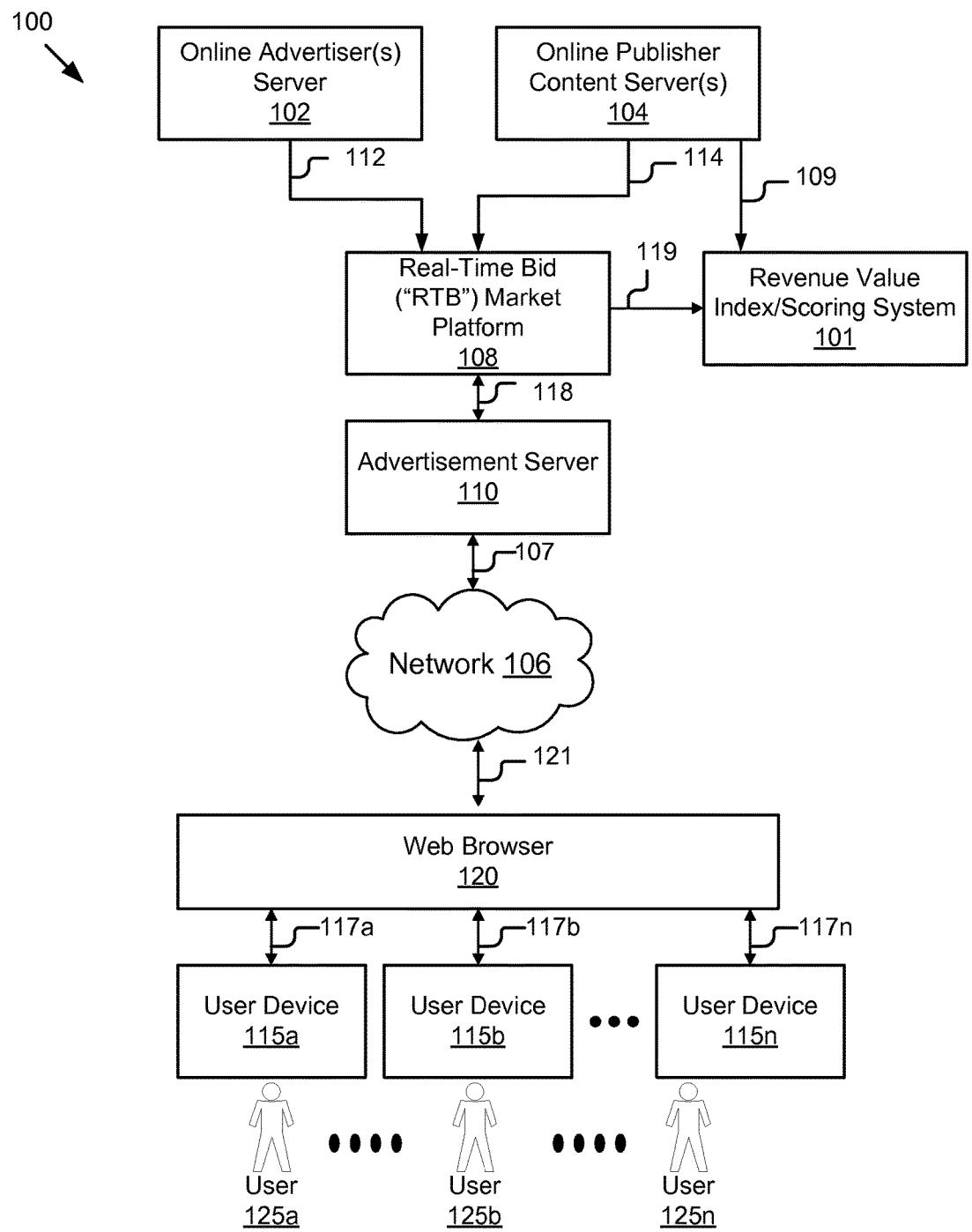
FIG. 1 is high-level block diagram, illustrating an example system and example online or digital advertising environment in which the revenue value index and scoring system for measuring the value of ad impressions or users operates according to some implementations of the present technology.

The systems and methods of this technology are configured for creating, establishing or otherwise generating a revenue value index and using it to score ad impressions and/or users for purposes of determining fair or informed pricing for ad placement or for providing analytics and information (for example, as a service) to publishers or other entities that may be interested. The revenue value index may be configured to evaluate data obtained or acquired from first-party and/or third-party and/or publisher data management platforms for the purpose of valuing either ad impressions or the users engaging the websites on which ads are likely to be placed. The revenue value index may be utilized for either providing value information or analytics to entities (for example, publishers) or for measuring the value of ad impressions or users for use in determining fair pricing in real-time auctions conducted for ad placement. As yet another example, the system and methods may use the revenue value index to match impression inventory to the most likely buyer within a given market or via direct relationships that exist with either agencies or market buyers.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus for performing the operations described. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present technology may take the form of an entirely hardware embodiment, an entirely software embodiment or an implementation containing both hardware and software elements. In some implementations, this technology is implemented in software, which includes but is not limited to, firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages, for example, high level programming languages such as "C," "Java," or "Pascal," may be used to implement the teachings of the technology as described herein. The computers may be specially programmed, and be configured with special purpose hardware. Each computer may have a single processor, a multiprocessor or may comprise multiple computers, each of which may include a single processor or a multiprocessor, operably connected over a computer network. Each computer have controlled by one of a variety of operating systems including Microsoft Windows, Macintosh, Linux, Unix, or a Java-based operating system, to name a few.

Each computer in the system may include one or more input and output (I/O) unit, a memory system, and one or more processing units. The input-output ("I/O") units of each computer may be connected to various input/output devices, such as a mouse, keyboard, video card (video monitor), sound card (with speakers), network card, and printer. The memory system in a typical general purpose computer system usually includes a computer readable and writeable nonvolatile recording medium, of which a magnetic disk, a flash memory and tape are examples. The memory system operably holds the operating system, utilities, and application programs. It should also be understood the invention is not limited to the particular input devices, output devices, or memory systems used in combination with the computer system or to those described herein. Nor should the invention be limited to any particular computer platform, processor, or high-level programming language.

System Architecture Overview

FIG. 1 illustrates a block diagram of a revenue value index/scoring system 101 illustrated in an ad placement environment 100 in which the disclosed implementation of the revenue value index/scoring system is operable. The revenue value index/scoring system 101 is configured and may be used to either value impressions as an auction occurs in real time or may be used to help publishers value impressions for their own information and later action. The environment 101 includes: an online or digital advertiser server or website 102 (representing one or more online or digital advertisers), an online or digital publisher content server or website 104 (representing one or more online publishers), a network 106, and a real-time bidding ("RTB") market platform 108. The online or digital advertiser server 102 may be a computing system (of one or more computers or processors, either linked or distributed) that submits bids to the RTB market platform 108 to purchase publisher inventory and have advertiser advertisements shown on the publisher's website. The online or digital advertiser server 102 is illustrated as coupled to the RTB market platform 108 via signal line 112 and the online or digital publisher content server 104 is illustrated as coupled to the RTB market platform 108 via line 114. The online or digital publisher content server 104 may be a computing system that maintains online or digital content that attracts users and contains placeholders for ads (from the ad inventory) that are submitted to the RTB market, for sale to advertisers. The online or digital publisher content server 104 has access to data provided by the revenue value index and scoring system 101, either directly (not expressly illustrated in FIG. 1) or otherwise. The RTB 108 may be a computing system that provides a real-time bidding market that allows advertisers to bid on publisher inventory in real-time. While only a single advertiser server 102, a single publisher content server 104 and a single network 106 are shown in FIG. 1, it should be recognized that there may be thousands or even millions of advertiser servers 102, publisher content servers 104, or networks 106. FIG. 1 is merely provided as one example illustration of the systems 102, 104, and 106, which present the environment in which the present technology may be implemented.

The advertiser server 102 is coupled by signal line 112 for communication with the real-time bidding market 108. Although not explicitly shown in FIG. 1, it should be recognized that any and all the signal lines illustrated in FIG. 1 may route, via the network 106, as illustrated in FIG. 1. The advertiser 102 is coupled to the real-time bidding market 108 to send bids on impressions, and also provides advertisement content, advertising target information, price, or any other information related to the impression or necessary to serve the ad. The RTB market platform 108 is a real-time bidding market, which allows advertisers to bid on publisher inventory in real-time.

The online publisher content site or server 104 is a computing device for hosting a website with any type of content for publishing. The signal line 114 provides information to the RTB 108 about which impressions on the publisher's site are available for the RTB market. A control line 109 from 101 to 104 indicates that scores and other analytics may be provided directly to the publishers for future use by them.

The network 106 is a conventional type, wired or wireless, and may have any number of configurations such as a star configuration, token ring configuration or other configurations known to those skilled in the art. The network 106 represents use of mobile applications designed to operate on smartphones, tablet computers, and other mobile devices. The mobile applications may be available through application distribution platforms, operated by the owners of the mobile applications or others. These mobile applications may be downloaded from the distribution platforms to target devices. Furthermore, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

The RTB market platform 108 is coupled by signal line 118 to an advertisement server 110, which serves ads. Advertisers participating in the RTB market send their bids and ad tags simultaneously as they bid. Advertisers who use ad consoles typically preload their ad code and the ads corresponding to the ad code are served from the ad server 110. In some implementations, the ad server 110 is software that receives requests for ad units, submits, and then fulfills those requests with online or digital content. The advertisement server 110 is coupled to the network 106 for communication and interaction with online or digital advertisers 102 and the online or digital publisher content site 104. A user 125 who is browsing the web is a potential customer of ads. There may be any number of users 125a, 125b, through 125n, who are coupled via the network 106 to online or digital publisher sites 104. For example, when a user (125a-125n) navigates to a web page that is supplied by an online or digital publishing content site 104, requests are sent to the online or digital publishing content site 104 (the publisher's server) for content. The user (125a-125n) navigates to a web page via a web browser 120. The browser may be any one of Chrome, Safari, Firefox, Internet explorer or the like.

The online or digital publishing content site 104 (publisher) serves up the content, which includes executable javascript tags. Once these tags are loaded in the user's web browser 120 (via lines 117a, 117b, through 117n), they are executed (via lines 121 and 107) and notify the ad server 110 that there is an impression that needs filling. The impression is then submitted to the Real-Time Bidding (RTB) market platform 108, where advertisers bid to fill the impression with their advertisements. The RTB market platform 108 applies market floors, provided either by publishers or the market operator, for each of the competing advertisers and uses these market floors, along with the advertiser bids, to determine the winner of the auction and their clearing price. In the event that all of the received bids are too low, the Auction may not clear. The operation of the RTB market platform 108 will be described in more detail below with reference to FIG. 2.

Figure 2:
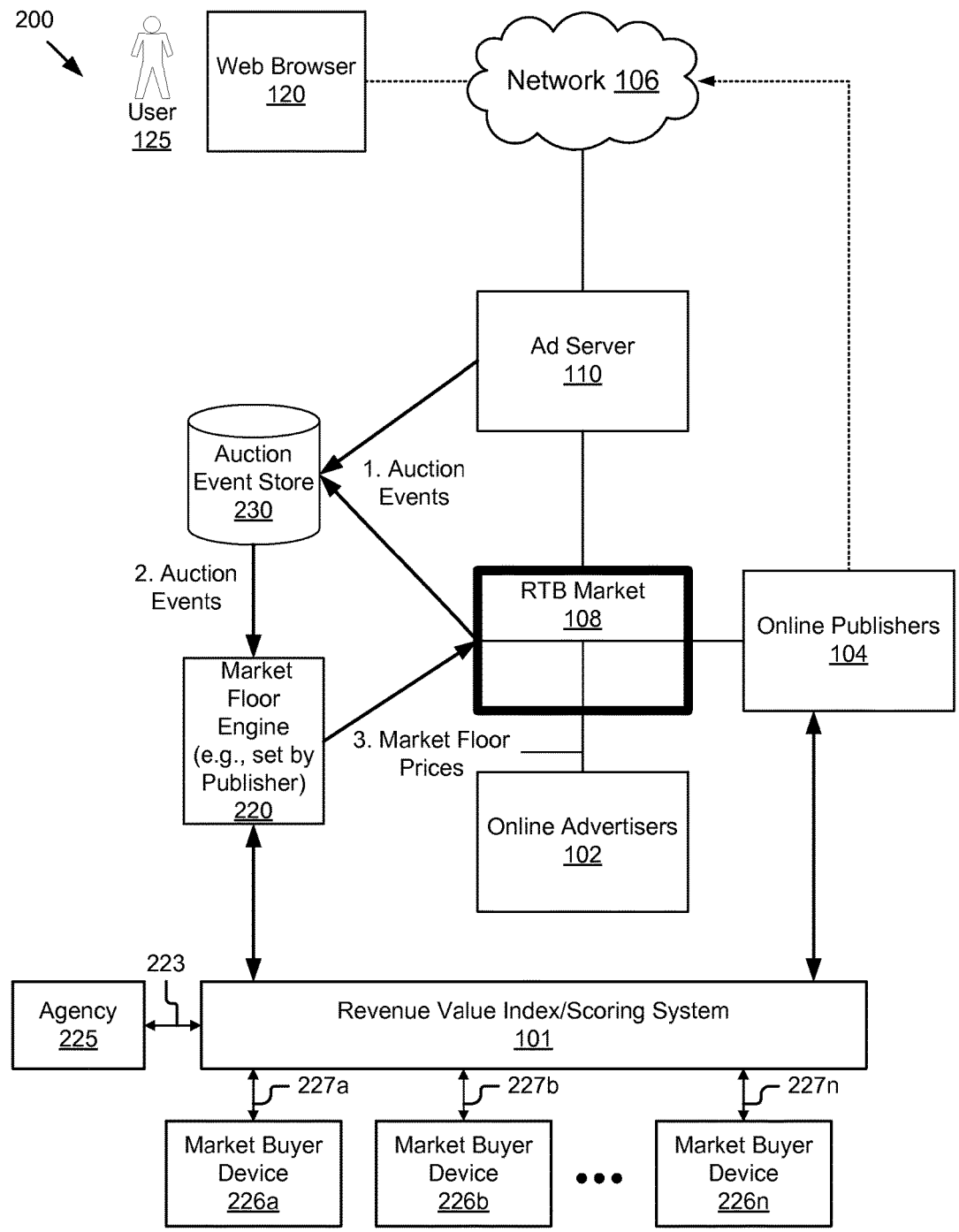
FIG. 2 is a high-level block diagram, illustrating an example revenue value index and scoring system, configured to operate with a market floor engine and auction event store operating a floor auction for ad placement.

Referring now to FIG. 2, the RTB market platform 108 implements a real-time bidding market. In the implementations described here, the RTB market platform 108 conducts a market floor auction for ad placement, which is a specialized auction that determines an auction winner, auction clearing price based on the bids submitted by advertisers, and per-advertiser market floors that are calculated and distributed by the market floor system 100. In some implementations, an auction event store 230 may include a large collection of computers arranged in a distributed, computational, and storage grid. The auction event store 230 may store events from the Advertisement server 110 and RTB market platform 108. A market floor engine 220 determines and provides market floor prices, which may in some instances be dynamically or selectively set by publishers. In some implementations, the market floor engine 220 may be an analytics engine that processes auction event data in either real-time, near-real-time, or batch mode (FIG. 5), determines market floors based on this data, and assesses the revenue impact of using these market floors compared to publisher "static" floors and/or other benchmarks. The publisher may determine market floors by deriving data from the user value index/scoring system 101. The revenue-value index and scoring system 101 may be directly coupled to either market buyer devices 226a, 226b, or 226n, via lines 227*a*, 227*b*, through 227*n*, or an agency 225, via line 223, to directly provide data and revenue value to any of these entities.

During an RTB auction, the advertisement server 110 and RTB market platform 108 generate a number of events that include information about the context in which the RTB auction is occurring. An "event profile" (with the type of information available in the auction bids that are received) may be generated when all of the bids from the advertisers in an RTB auction have been received. An auction event store 230 may store information available in the "auction complete" event generated when an auction has completed. The auction event store 230 may include a large collection of computers arranged in a distributed, computational, and storage grid. The auction event store 230 in some implementations stores events from the advertisement server 110 and the RTB market system 108.

Figure 3:
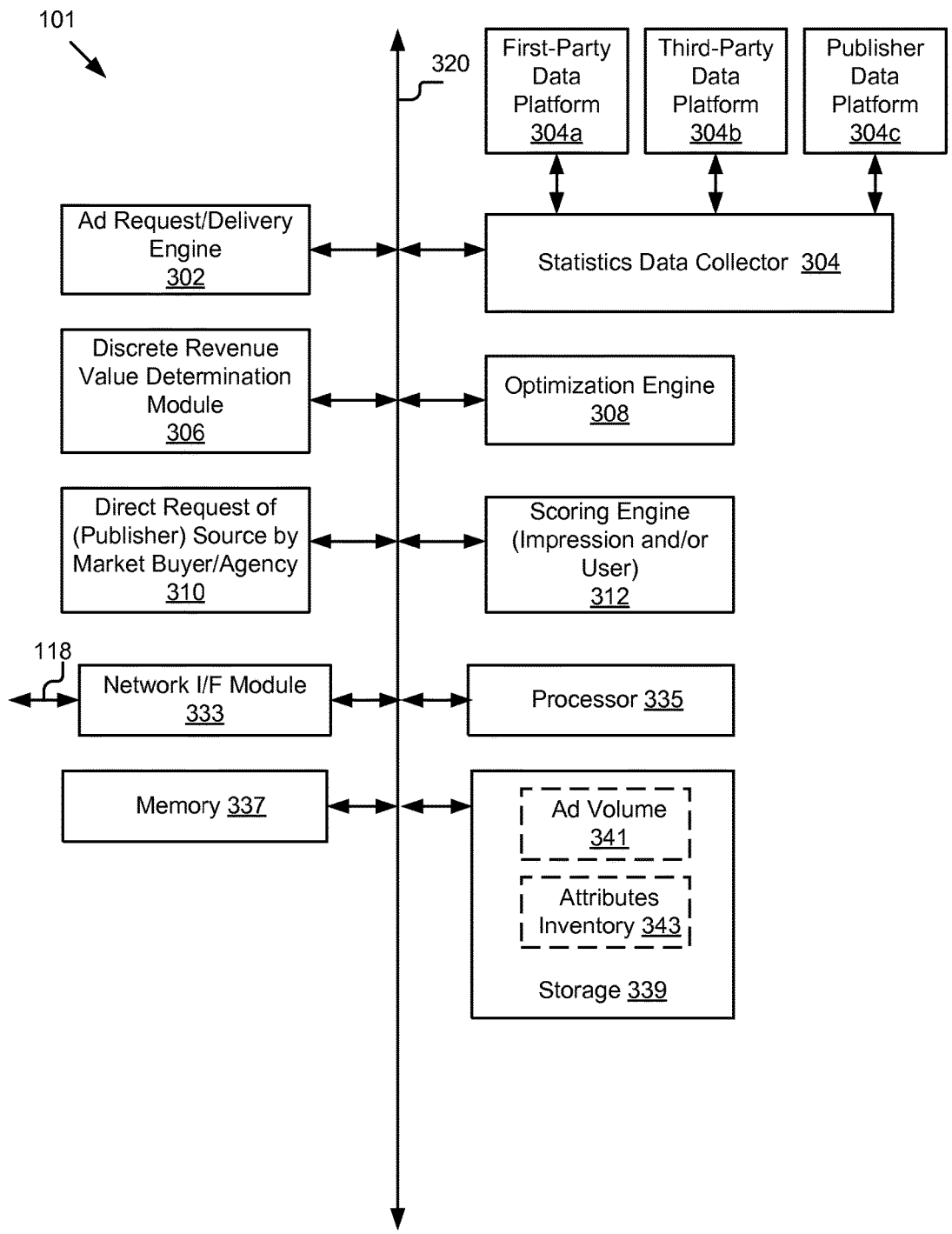
FIG. 3 is a block diagram, illustrating an example revenue value index and scoring system for valuing ad impressions or users, and its hardware components.

Referring now to FIG. 3, an example implementation of the revenue-value index and scoring system 101 is illustrated. This implementation of the revenue-value index and scoring system 101 comprises an ad request and delivery engine 302, a statistics data collector 304, a discrete revenue value determination module 306, an optimization engine 308 and a direct request of (publisher) source by User/Agency 310.

The ad request and delivery engine 302 is responsible for receiving ad requests and processing impressions for filling by advertisement. The ad request and delivery engine 302 is coupled for communication with the online or digital publisher content servers (publisher sites) 104, via a signal line, to receive advertisement requests and to serve advertisements. The ad request and delivery engine 302 also receives indirect demand, direct demand, and optimization information. The ad request and delivery engine 302 processes this information and selects a bid to be served as an advertisement. In some implementations, the ad request and delivery engine 302 may advantageously run a modified second-bid auction to determine the winning bid. In other implementations, the ad request and delivery engine 302 may run other types of auctions.

The statistics data collector 304 is a module or platform for providing, storing, or processing data (e.g. historical data, static floor data, or other data obtained from a first-party platform or a third-party platform etc.) pertinent to evaluating the revenue value of impressions or users for computing fair pricing or revenue market floors. The statistics data collector 304 is coupled to the ad request and delivery engine 302 to receive information regarding auction results, advertisement requests received, ads served, winning/losing bids, impression type, etc. The statistics data collector 304 processes this information and stores it so that it is readily available for use by the discrete revenue value determination module 306 and the optimization engine 308. The statistics data collector 304 is also coupled to the first-party platform 304*a*, the third-party platform 304*b*, and/or a publisher data platform 304*c*. The statistics data collector 304 may be a data management platform (mobile or otherwise, with cloud computing) that is configured to provide data on target audiences for publishers based on acquiring data from first-party, publisher data, and third-party platforms. This data includes information on every interaction between a publisher's content and its audience.

A third party database 304*b* may provide system or non-personal information or attributes including number of visitors to a particular website, types of browsers used, internet service providers (ISPs) used, visit times and length of visits, pages visited, referring pages and exit pages (also known as log files), information from profiling databases such as behavioral or look-alike data based on usage by visitors with similar attributes to pages with similar attributes, the location of a given impression on the page, the number of ad units on a page, the nature and type of other content on the site, historic information about a given page such as click-through rates and time spent by users on the page, and any other information to measure the popularity, traffic, and effectiveness of the website or any specific area within it. Third party databases 304*b* may also provide personal information including, but not limited to, product order information, name, address, phone number, email address, credit card information, promotional surveys, sweepstakes, email programs, direct mail programs, site registration, buying habits, areas of interest etc.

The statistics data collector 304 is coupled for communication with the discrete revenue value determination module 306 and the optimization engine 308. In some implementations, the statistics data collector 304 stores the information in a plurality of formats including a real-time format, a near-term format, and a long-term format. In other implementations, the statistics data collector 304 modifies the data in these formats as additional information is received from the ad request and delivery engine 302.

The discrete (per publisher or otherwise) revenue value determination module 306 may be software and routines for providing control information to the optimization engine 308. The discrete revenue value determination module 306 computes effective floor prices (or base prices) for publisher content based on pre-determined criteria, for example, the market floors values, overall minimum (a default price), second highest bidder, revenue amount for the entity operating the floor market system, the static floor price etc. The discrete revenue value determination module 306 may determine the relationship between the highest bid, and various discrete floors computed per advertiser or publisher. The optimization engine 308 is software and routines for optimizing computations, for example, of revenue, based on comparing newly computed revenue amounts to previously computed revenue amounts.

The ad request and delivery engine 302, the statistics data collector 304, the discrete value determination module 306, the optimization engine 308, and the direct demand/request of source 310 (from publisher) are modules coupled by bus 320 for communication and interaction with each other as well as the network interface module 333, processor 335, memory 337 and storage 339. The storage 339 may comprises an ad volume 341 and attribute inventory 343 for tracking purposes.

The network interface module 333 is coupled to network 106 by the signal line 118 and a bus 320. The network interface module 333 includes ports for wired connectivity such as but not limited to USB, SD, or CAT-5, etc. The network interface module 333 links the processor 335 to the network 106 that may in turn be coupled to other processing systems. The network 106 (FIG. 1) may comprise a local area network (LAN), a wide area network (WAN) (e.g., the Internet), and/or any other interconnected data path across which multiple devices may communicate. The network interface module 333 provides other conventional connections to the network 106 using standard network protocols such as TCP/IP, HTTP, HTTPS and SMTP as will be understood by those skilled in the art. In other embodiments, the network interface module 333 includes a transceiver for sending and receiving signals using WIFI, Bluetooth® or cellular communications for wireless communication.

The processor 335 comprises an arithmetic logic unit, a microprocessor, a general purpose controller or some other processor array to perform computations and provide electronic display signals to a display device. The processor 335 is coupled to the bus 320 for communication with the other components. Processor 335 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. It will be obvious to one skilled in the art that other processors, operating systems, sensors, displays and physical configurations are possible.

The memory 337 stores instructions and/or data that may be executed by processor 335. The memory 337 is coupled to the bus 320 for communication with the other components. The instructions and/or data may comprise code for performing any and/or all of the techniques described herein. The memory 337 may be a dynamic random access memory (DRAM) device, a static random access memory (SRAM) device, flash memory or some other memory device known in the art.

In one embodiment, storage 339 stores data, information and instructions used by the ad request and delivery engine 302, the statistics collector 304, the discrete revenue value determination module 306, the optimization engine 308, and the direct request of source (from publisher) by User/Agency 310. Storage 339 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The data storage 339 is coupled by the bus 320 for communication with other components of the user value index and scoring system 101 for impression evaluation and allocation.

One or more of the ad request and delivery engine 302, the statistics data collector 304, the discrete revenue value determination module 306, the optimization engine 308, and the direct request source 310 are software or routines executable on the processor 335. In some implementations, one or more of the delivery engine 302, the statistics data collector 304, the discrete revenue value determination module 306, the optimization engine 308, and the direct request source 310 store data that, when executed by the processor 335, causes the collectors/modules to perform the operations described below. In yet other implementations, one or more of the ad request and delivery engine 302, the statistics data collector 304, the discrete value determination module 306, the optimization engine 308, and the direct request source 310 (from publisher) are instructions executable by the processor 335 to provide the functionality described in the flow charts that follow. In still other implementations, one or more of the ad request and delivery engine 302, the statistics data collector 304, the discrete revenue value determination module 306, the optimization engine 308, and the direct request of source 210 (from publisher) are stored in the memory 337 and are accessible and executable by the processor 335. In some instances, the optimization engine 308 includes a multiplier (a) calculation module, a data retrieval module, and a classification module (to execute any classification criteria).

Figure 4:
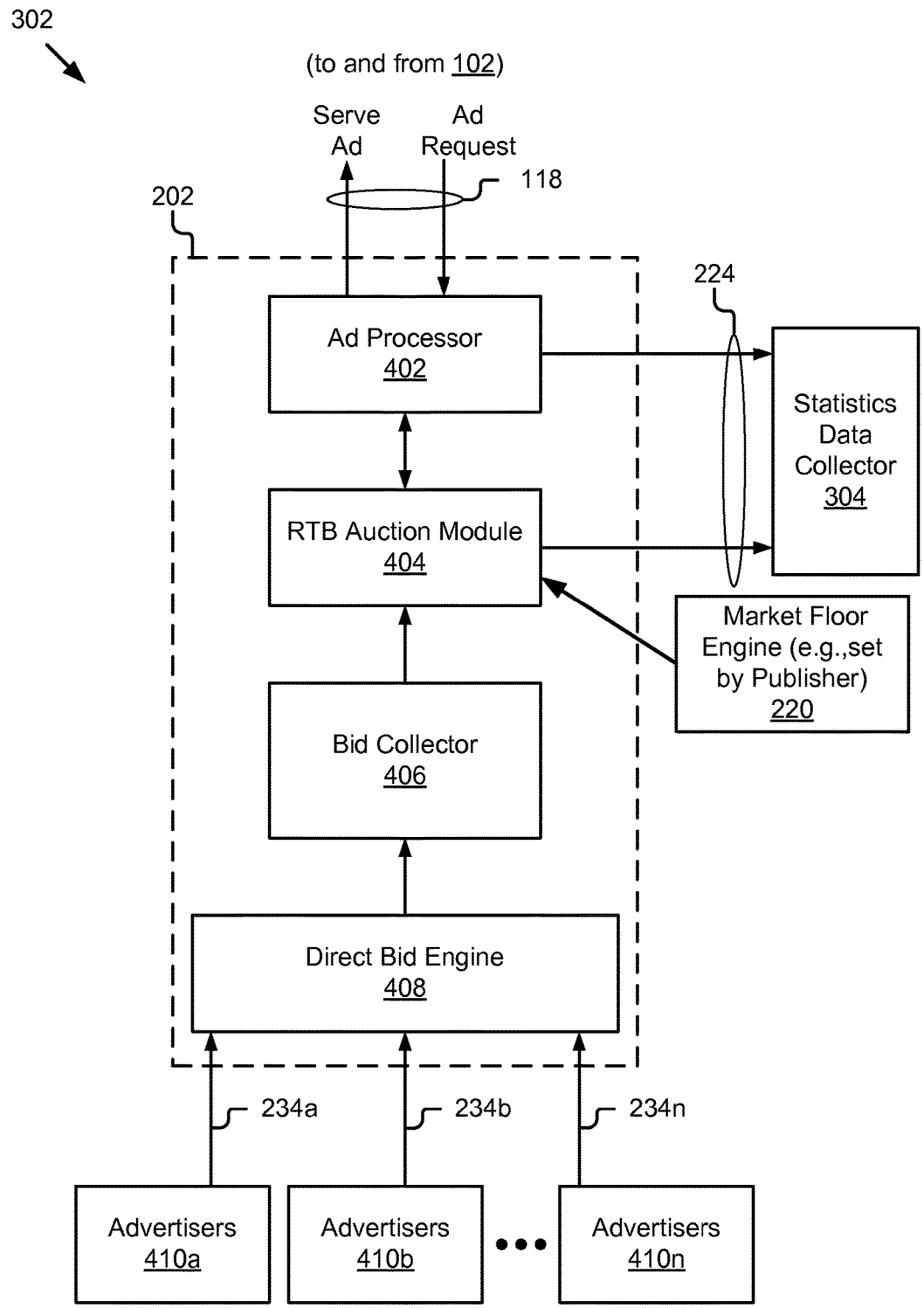
FIG. 4 is a block diagram illustrating an example floor auction platform.

Referring now to FIG. 4, an implementation of the ad request and delivery engine 302 is described. In this implementation, the ad request and delivery engine 302 comprises an advertisement processor 402, an RTB auction module 404, a bid collector 406, and a direct bid engine 408.

The ad processor 402 handles the technical mechanics of receiving an advertisement request, requesting an advertisement to send in response, and serving up an advertisement in response to the received advertisement request. The operation of the advertisement processor 402 is described for handling a single advertisement request; however, it should be recognized that the advertisement processor 402 can be scaled to handle thousands or millions of advertisement requests. The advertisement processor 402 is coupled to a signal line (e.g., signal line 118) to receive an advertisement request. The processor 402 is also coupled to a signal line (e.g., signal line 118) to serve advertisements. In the simplest case, the advertisement processor 402 receives an advertisement request and stores information about the advertisement request. For example, the information stored includes the source of the advertisement request, the site of the advertisement request, information about advertisement placement and other metrics. The advertisement processor 402 then issues a request to the auction module 404 for an advertisement to be served in response to the advertisement request. In response, the auction module 404 returns an advertisement to be served. The advertisement processor 402 serves the received advertisement and records information about the serving of the advertisement. The advertisement processor 402 also outputs on a signal line 224 information about: 1) the advertisement request; 2) the advertisement that was served; 3) the serving of the advertisement; and 4) any error information about the serving of the advertisement. The advertisement processor 402 outputs this information to the statistics data collector 304.

The RTB auction module 404 performs an auction as is described in more detail below and as a result of the auction identifies an impression. As has been described above, the advertisement identified as a result of the RTB auction is sent to the advertisement processor 402 so it can be served in response to the advertisement request. The RTB auction module 404 is coupled to the bid collector 406 to receive bids in response to any advertisement request that is received from the advertisement processor 402. The auction module 404 also records information about the auction such as the highest bidder, the second-highest bidder, information about the bids, information about the prices and various other metrics related to the auction. This information is output on signal line 224 to the statistics data collector 304 for storage and use by other modules of the revenue value index and scoring system 101.

The bid collector 406 is software and routines for gathering bids and sorting them for submission to the auction RTB auction module 404 in response to an auction. The market floor engine 220 (FIG. 2) is coupled to the RTB auction module 404. The bid collector 406 has an input coupled to an output of the direct bid engine 408. The direct bid engine 408 receives bids from independent bidders or online or digital advertisers 102 (any of advertisers 410a, 410b, through 410n via signal lines 234a, 234b through 234n, respectively).

The direct bid engine 408 generates bids based upon optimization information from the optimization engine 308. The direct bid engine 408 generates bids based upon optimization information from the optimization engine 308. In one embodiment, the direct bid engine 408 receives priority revenue values that are used to generate bids from the optimization engine 308. The direct bid engine 408 is advantageously adaptive in response to the information from the optimization engine 308. The direct bid engine 408 is used to generate bids from the direct request (publisher) source 310 (by user). The direct bid engine 408 advantageously generates bids with different prices based upon the information from the optimization engine 308. Depending on factors such as priority, pricing, availability provided by the optimization engine 308, the direct bid engine 408 generates bids and sends them to the bid collector 406 for consideration in the auction. The direct bid engine 408 is coupled to signal line 234 to receive the information from the optimization engine 308. The direct bid engine 408 has an output coupled to an input of the bid collector 406.

Figure 5:
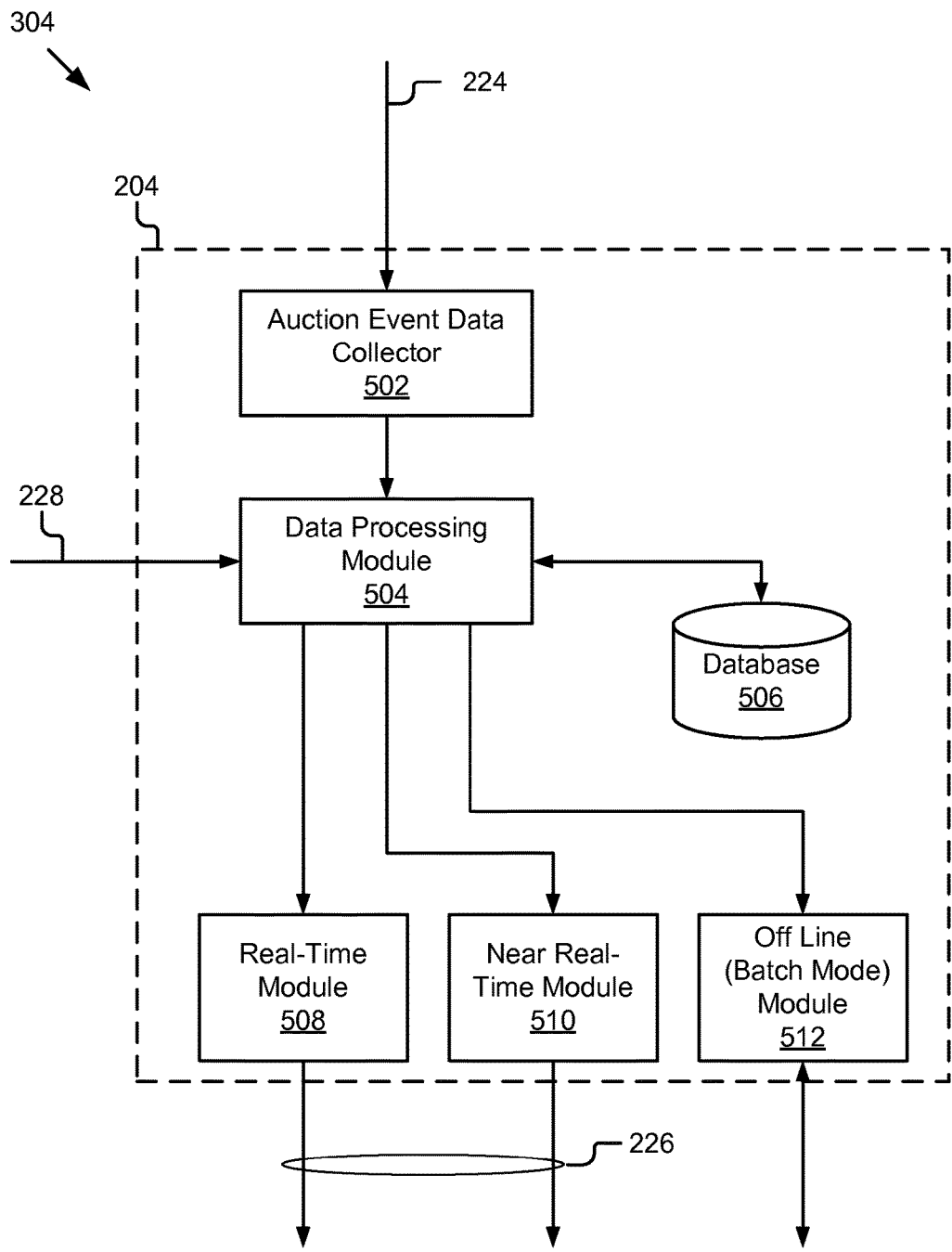
FIG. 5 is a block diagram illustrating the process of collecting auction event data in either real-time, near real-time, or batch mode.

Referring now to FIG. 5, an example implementation of the statistics data collector 304 is described. In some implementations, the statistics data collector 304 comprises an auction event data collector 502, a data processing module 504, a database 506, a real-time module 508, a near real-time module 510 and an off-line module 512.

The auction event data collector 502 is temporary storage for information received from the ad request and delivery engine 302 on the signal line 224. The auction event data collector 502 has an input to receive information from the ad request and delivery engine 302. Since the information is received from both the advertisement processor 402 and the RTB auction module 404, this information needs to be temporarily stored until it can be processed by the data processing module 504.

The data processing module 504 is responsible for processing and transferring information about impressions and the RTB auction from the auction event data collector 502. The data processing module 504 receives the information from the auction event data collector 502 and stores it immediately in the real-time module 508. The data processing module 504 continues to process the information and after some processing stores it in the near real-time module 510. The output of the real-time module 508 and the near real-time module 510 are provided on a signal line 226 to the discrete revenue value determination module 306 and the optimization engine 308. These real-time and near real-time modules 508 and 510 are also responsive to requests for additional information from these modules 306, and 308. After additional processing, the information is stored in the off-line module 512. For example, information that is immediately available about advertisement calls, corresponding served advertisements and information about completed auctions may be stored in the real-time module 508. After additional processing by the data processing module 504, the specific advertisement request, corresponding served advertisement, and corresponding RTB auction performed to identify the advertisement are grouped together and stored in the near real-time module 510. After yet further processing by the data processing module 504, additional information about whether the impression was actually delivered and presented or other information is added to the record and the information is moved to off-line module 512. The data processing module 504 is also coupled to a signal line 228 to receive corrections or modifications to the data from the discrete revenue value determination module 306. Based on input information on signal line 228, the data processing module 504 modifies the information in the off-line (batch mode) module 512. In one embodiment, the off-line module 512 is accessible by APIs and other user interfaces and tools. The data processing module 504 also communicates with the database 506 to store information related to each of the modules 508, 510 and 512.

Referring to FIG. 6, the revenue value index may use algorithms to compute impression values. In some implementations, an algorithm may compute an impression score (total impression score) to measure the value of a particular impression. The impression score may be computed by considering individual attributes of an impression and assigning scores to each attribute. In some implementations, an algorithm may be configured to compute a user score by considering individual attributes that relate to a user. In some implementations, an algorithm may be configured to computer a score based on attributes for the impression and user. FIG. 7 illustrates one example to illustrate this approach. For example, varying scores (either "4," "7," "8," or "9") are assigned to a myriad different attributes (including elements that are either a function of the impression itself or a function of the user). For example, certain attributes including elements that are a function of the impression itself, may include "Above the Fold," and "Medium Quality Pub." As another example, certain attributes including elements that are a function of the user may include "US Impression," "New York Geo," "User Session Frequency 18," "Auto Intender," "In Market" Cruise Buyer," and "In Market Electronics (e.g., laptop) Buyer"). Consideration of these attributes computes a total score of "58" for a particular impression designated in this example as "User Impression 1." In some implementations, users may be evaluated and measured to determine user scores. In yet other implementations, the algorithms may take user scores and impression scores to determine impression values. For example, in some instances, if a male is accorded a score of "5" and an auto-intender is accorded a score of "10," an algorithm may place a value of "20" to a male auto-intender rather than simply a "15." Therefore, consideration of various factors or criteria in combination may result is a different score rather than just one by adding individual scores accorded to individual factors or criterion.

Figure 8:
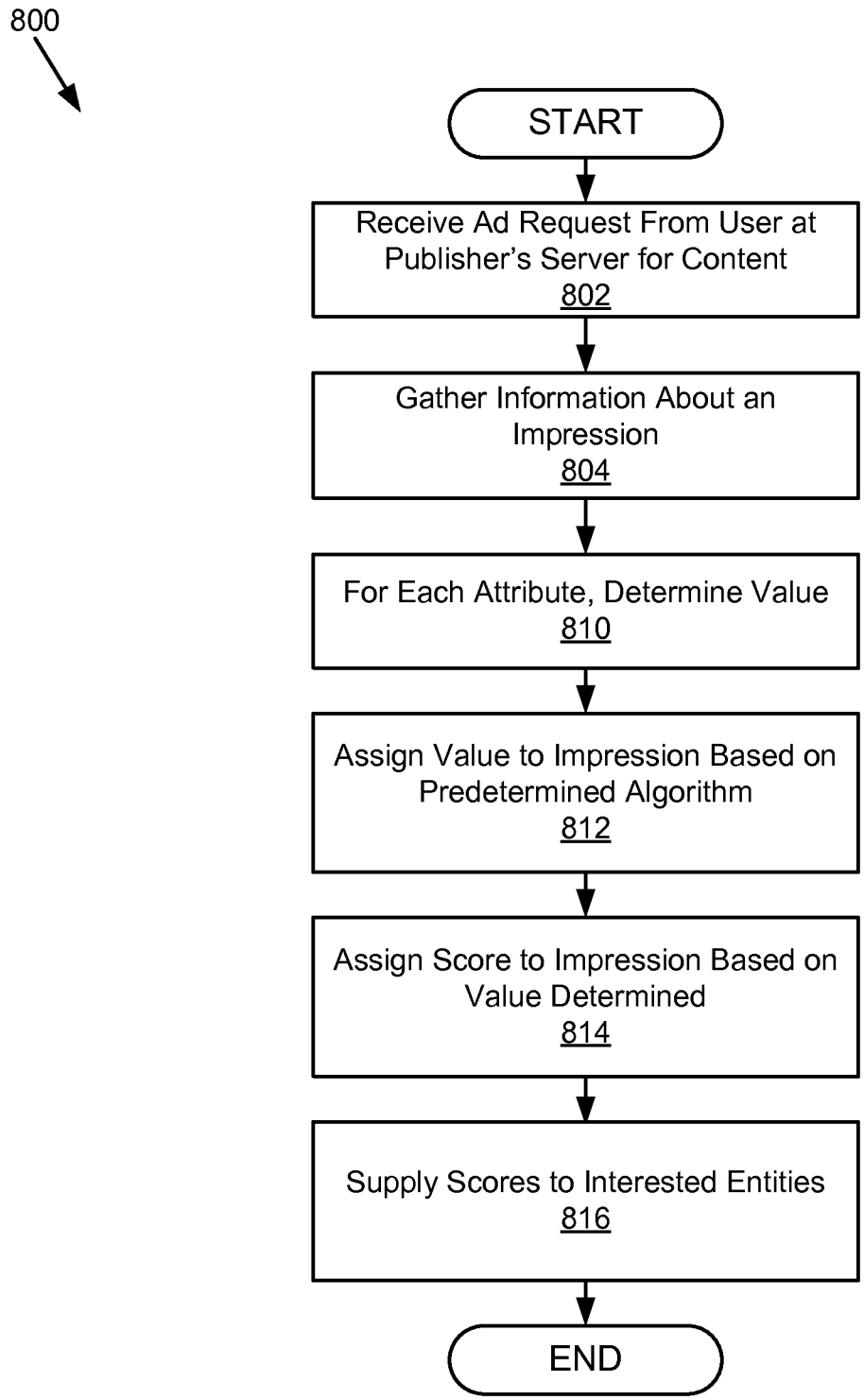
FIG. 8 is flow chart representing an example method including operations for creating a user value index and scoring scheme for scoring impressions.

Referring now to FIG. 8, the method 800 begins at block 802, where upon receiving an ad request from a consumer at the publisher's server 104 for content, the discrete revenue value determination module (306 in FIG. 3) uses one or more operations to gather information or attributes about an impression (block 804). The method 800 proceeds to block 810, wherein one or more operations of the method 800 determine a value for each attribute of the impression. The method 800 proceeds to the next block 812 wherein one or more operations assign a value to the impression based on a predetermined algorithm. The method 800 proceeds to the next block 814, wherein one or more operations of the method 800 assigns a score to the impression based on a value determined. The method 800 proceeds to the next block 816, wherein one or more operations of the method 800 supplies these scores to the interested parties.

Figure 9:
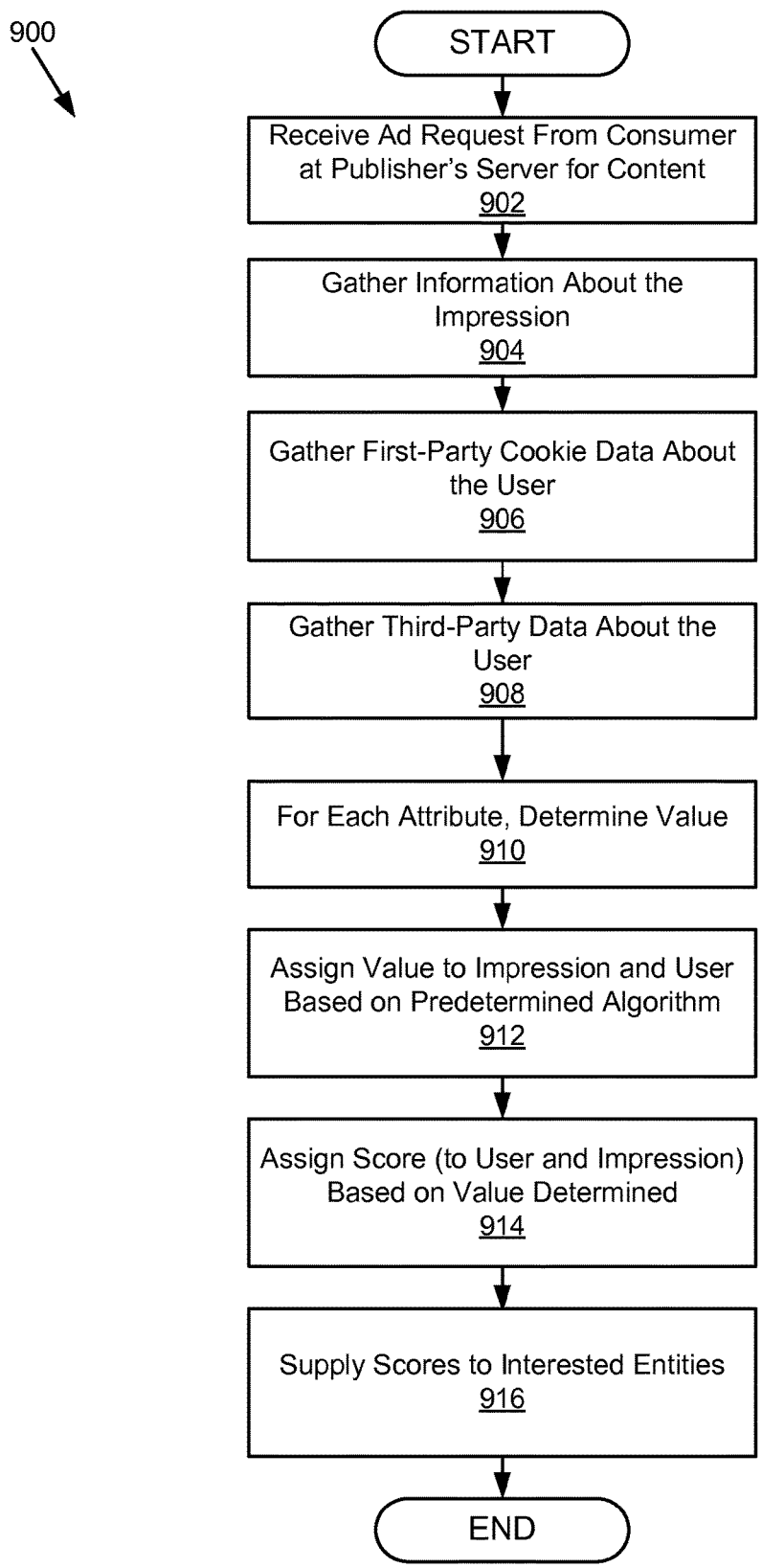
FIG. 9 is a flow chart representing an example method including operations for creating a user value index and scoring scheme for scoring users and impressions.

Referring now to FIG. 9, the method 900 begins at block 902, where upon receiving an ad request from a consumer at the publisher's server 104 for content, the discrete revenue value determination module (306 in FIG. 3) uses one or more operations to gather information about an impression (block 904). The method 900 proceeds to block 906, wherein one or more operations of the method 900 gather first-party cookie data about the user. The method 900 proceeds to block 908 wherein one or more operations of the method 900 gather third-party data about the user. The method 900 proceeds to block 910, wherein one or more operations of the method 900 determine a value for each attribute of the impression. The method 900 proceeds to the next block 912 wherein one or more operations assign a value to the impression and the user based on a predetermined algorithm. The method 900 proceeds to the next block 914, wherein one or more operations of the method 900 assigns a score to the impression based on a value determined. The method 900 proceeds to the next block 916, wherein one or more operations of the method 900 supplies these scores to the interested parties.

In the preceding description, for purposes of explanation, numerous specific details are set forth in order to provide a thorough understanding this technology. It will be apparent, however, that this technology can be practiced without some of these specific details. In other instances, structures and devices are shown in block diagram form in order to avoid obscuring the innovative aspects. For example, the present technology is described in some implementations above with reference to particular hardware and software, yet it is not limited to only the particular hardware and software referenced.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present inventive technology be limited not by this detailed description, but rather by the claims of this application. As will be understood by those familiar with the art, the present inventive technology may be embodied in other specific forms without departing from the spirit or essential characteristics thereof. Likewise, the particular naming and division of the modules, routines, features, attributes, methodologies and other aspects are not mandatory or significant, and the mechanisms that implement the present inventive technology or its features may have different names, divisions and/or formats. Furthermore, as will be apparent to one of ordinary skill in the relevant art, the modules, routines, features, attributes, methodologies and other aspects of the present inventive technology can be implemented as software, hardware, firmware or any combination of the three. Also, wherever a component, an example of which is a module, of the present inventive technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present inventive technology is intended to be illustrative, but not limiting, of the scope of the present invention, which is set forth in the following claims.

What is claimed is:

1. A method for providing a revenue-value-index and scoring system within a network interface for dynamic ad placement on a webpage by an ad server over a network, the method comprising:

in a platform including a data processor and memory storing executable code, said data processor driven by said executable code to execute control and web-based actions via said network interface for receiving an ad request, by an ad request and delivery engine in said platform coupled to the network, the ad request and delivery engine coupled to the network interface, to receive an ad request and to serve and value an ad impression from a publisher device;

receiving, by a statistics data collector in the platform coupled to the network interface including the data processor driven by said executable code to execute said control and web-based actions via the network interface, information about the ad impression from a plurality of data management platforms coupled to the ad server, including a first-party data platform, a third-party data platform, and a publisher data platform;

processing, by the statistics data collector, the received information and storing the processed information in at least one modifiable format including a real-time format, near-term format, and long-term format modifying, by the statistics data collector, the processed information upon receiving additional information by the ad request in at least one of the real-time format, the near-term format, and the long-term format as additional information is received from the ad request and delivery engine;

determining, by a discrete determination module coupled, by the network, to the data processor, the network interface and the ad server, a plurality of different attributes in the stored processed information relating to the ad impression comprising a context, content on a webpage, and historic information relating to click-throughs to the webpage and viewability of the webpage by a user device;

assigning a first respective score, by the data processor executing said control and web-based actions via said network interface, to each individual one of the plurality of different attributes by a scoring index for evaluating ad impressions and designating the first respective individual score to each individual attribute;

computing a total first score, by the data processor, by aggregating first respective individual first scores assigned to each individual one of the plurality of different attributes for each ad impression, the total score representative of a revenue value determined for each ad impression and providing the total score to a revenue-value index;

providing, by the data processor, the revenue value for each ad impression provided for each ad unit on every webpage of a website;

receiving information on a user, by the data processor executing said control and web-based actions via said network interface, from the data management platforms and one or more sources;

assigning a separate respective second score, by the data processor executing said control and web-based actions via said network interface, to each individual one of the plurality of different user attributes, and to consider with the revenue value for each ad impression and context; and computing another second total score for the ad impression, by the data processor executing said control and web-based actions via said network interface, by aggregating separate respective second scores assigned to each individual one of the plurality of different user attributes to establish another second revenue value for the ad impression and providing the second revenue value to the revenue-value-index;

computing, by the data processor, a first overall revenue from each webpage by adding the revenue value for each ad impression for each ad unit in each webpage;

computing, by the data processor, a second overall revenue of the website or network of sites by adding together the first overall revenue value for each webpage on a website or network of sites.

2. The method of claim 1, further comprising: providing access to a publisher device to obtain at least individual components of the total first score for user segmentation or to provide access to the revenue-value-index to match impression inventory to one or more potential buyers.

3. The method of claim 2, further comprising user activity that includes first-party cookie data relating to the user.

4. The method of claim 1, wherein the network is a telecommunications network for sending data in a variety of different communication protocols, said telecommunications network including at least one of a wireless communication network or a cellular communications network for sending and receiving data via at least one of short messaging service, multimedia messaging service, hypertext transfer protocol, direct data connection, wireless access point, and email.

5. The method of claim 1, wherein the ad request and delivery engine accesses stored information including a source of the ad request, a site of the ad request, and information about advertisement placement.

6. The method of claim 1, wherein the revenue value for each ad impression is used to inform a price of a market floor for ad placement.

7. The method of claim 1, wherein the data management platforms include the first-party platform that is mobile with cloud computing capability.

8. The method of claim 1, wherein the data management platforms include the third-party platform from which the data processor receives at least:

1) system and non-personal information including a number of visitors to a particular website, types of browsers, visit times and length of visits by users by their user device, webpages visited, referring pages and exit pages, a location of a given impression on the webpage, the number of ad units on the webpage, historic information about a given webpage including click-through rates and time spent by users on the webpage, and 2) personal information including product order information, name, address, phone number, email address, credit card information, promotional surveys, sweepstakes, email programs, direct mail programs, site registration, buying habits, and areas of interest.

9. A system for providing a revenue-value-index via a network interface in a network for dynamic ad placement on a webpage over the network, the system comprising:

an ad request and delivery engine executed by a data processor in a platform coupled to the network, the ad request and delivery engine configure to communicate with digital publisher content servers to receive an ad request, configure to communicate to an ad server to serve an ad, and configure to communicate to receive indirect and direct requests, the ad request and delivery engine allocating ad impressions;

an optimization engine executed by the data processor in the platform configured to produce optimization information to generate direct bids at an auction based on revenue values computed for the ad impressions, the optimization engine coupled for communication to the ad request and delivery engine;

a revenue-value-index and scoring system executed by the data processor in the platform coupled for communication to the optimization engine and the ad request and delivery engine configured to compute total scores for the ad impressions by assigning respective individual first scores to a plurality of different attributes associated with the ad impressions, wherein each respective individual first score is assigned to each of the plurality of different attributes, and by aggregating each respective individual first scores;

the revenue-value-index and scoring system executed by the data processor further configured to generate revenue values for every webpage on a website by adding the total scores for the ad impressions for each ad unit on every webpage of a website and configured to compute an overall revenue of the website or network of sites by adding together the revenue values for each webpage on a website or network of sites;

a statistics-data collector executed by the data processor coupled to the revenue-value-index and scoring system via the network interface and configured to further receive information on a user and information on the ad impressions from data management platforms or other sources, configured to assign respective individual scores to each of a plurality of different attributes of the user by evaluating user activity including first-party cookie data and third-party user data and configured to compute a total score for each of the ad impressions by aggregating the respective individual scores assigned to the user to establish a revenue value for the ad impression; and the data management platforms coupled to the revenue-value-index and scoring system via the network interface, the data management platforms including a third-party platform from which the data processor receives at least 1) an input on system and non-personal information, including a number of visitors to a particular website, an input on types of browsers, an input on visit times and an input on length of visits by users by their user device, an input on webpages visited, an input referring to pages and exit pages, an input on a location of a given impression on the webpage, an input on a number of ad units on the webpage, an input on historic information about a given webpage including click-through rates and an input on time spent by users on the webpage, and an input received on other information to measure popularity, traffic, and effectiveness of the website or any specific area within it;

and 2) an input on personal information including product-order information, name, address, phone number, email address, credit card information, promotional surveys, sweepstakes, email programs, direct mail programs, site registration, buying habits, and areas of interest.

10. The system of claim 9, further comprising a publisher device is provided access to obtain at least individual components of the total scores for user segmentation or to the revenue-value-index and scoring system to match impression inventory to potential buyers.

11. The system of claim 10, wherein the statistics data collector modifies data received in a real-time format, a near-term format, and a long-term format as additional information is received from the ad request and delivery engine.

12. The system of claim 11, wherein the attributes include user session frequency via the user device.

13. The system of claim 11, wherein the network is a telecommunications network for sending data in a variety of different communication protocols, said telecommunications network including at least one of a wireless communication network or a cellular communications network for sending and receiving data via at least one of short messaging service, multimedia messaging service, hypertext transfer protocol, direct data connection, wireless access point, and email.

14. The system of claim 11, wherein the revenue value for the ad impression is provided to other entities, including, market buyers and agencies.

15. The system of claim 11, wherein the revenue value for the ad impression is used to inform a price of a market floor for ad placement.

16. The system of claim 11, wherein the data management platforms include a first-party platform, a publisher data platform, a third-party platform, and other sources.

17. The system of claim 11, wherein the statistics data collector includes an auction event data collector that has an input to receive information from the ad request and delivery engine.

* * * * *